United States Patent [19]

Strandberg

[11] Patent Number: 4,475,839

[45] Date of Patent: Oct. 9, 1984

[54] SUCKER ROD FITTING

[75] Inventor: Donald G. Strandberg, Park Forest, Ill.

[73] Assignee: Park-Ohio Industries, Inc., Cleveland, Ohio

[21] Appl. No.: 482,800

[22] Filed: Apr. 7, 1983

[51] Int. Cl.³ .................................................. F16D 9/00
[52] U.S. Cl. ....................................... 403/2; 403/267; 403/268
[58] Field of Search ............... 403/265, 266, 267, 268, 403/2

[56] References Cited

U.S. PATENT DOCUMENTS

| 4,127,741 | 11/1978 | Bauer et al. | 403/268 X |
| 4,315,699 | 2/1982 | Lusk | 403/361 |
| 4,360,288 | 11/1982 | Rutledge, Jr. et al. | 403/268 |
| 4,401,396 | 8/1983 | McKay | 403/268 X |

FOREIGN PATENT DOCUMENTS 681550 10/1952 United Kingdom ............... 403/267

Primary Examiner—Andrew V. Kundrat
Attorney, Agent, or Firm—D. Peter Hochberg

[57] ABSTRACT

A sucker rod fitting for connecting together in an end-to-end relationship a plurality of sucker rods to form a sucker rod string for driving a pump in an oil well by an above ground oil pumping unit, the fitting comprising an elongated body having a central bore extending from an open end to a closed end, and the bore being defined at its end sections by cylindrical end walls, and between its end sections by alternately converging and diverging tapered sections which cause any breakage in a retained sucker rod to occur within the fitting.

11 Claims, 2 Drawing Figures

SUCKER ROD FITTING

BACKGROUND OF THE INVENTION

In order to supply the pressure required to draw oil from the ground such as when the oil pressure itself is insufficient to lift the oil to the earth's surface, it is conventional to place a pump in the well and to drive the pump by a pumping unit on the earth's surface. The pumping unit is often connected to the pump by a string of interconnected sucker rods known as a sucker rod string. Although steel sucker rods have been widely used, it has more recently been found that lighter weight plastic and fiberglass reinforced plastic sucker rods are more effective since they allow use of smaller motors and pumping units, are not subject to the corrosion on steel rods, and they are less expensive to operate in the field.

Such non-metal rods must be connected in an end-to-end relationship to achieve the length required to connect the pump and the pumping unit, while providing rigidity to this rod string and to enable replacement of sections of the rod string when failures occur rather than requiring replacement of the entire rod string. While steel rods generally have lengths of 25 to 30 feet and diameters of ½ to 1½ inches, plastic and fiberglass reinforce plastic rods may be longer. For example, Bennet Industries markets a standard fiberglass reinforced resin rod having a length of 37 feet 6 inches and an outer diameter of 1 inch. In deep wells whose production tubes, through which the sucker rod string extends, exceed about 3000 feet, a combination of steel rods and fiberglass reinforced plastic rods are now frequently used. Sucker rod fittings are used to connect individual sucker rods. For example, U.S. Pat. No. 4,315,699 discloses a fitting having a high strength, elongated, metal cylindrical retainer and a stack of metal collets whose inner peripheral profile has the shape of a plurality of pairs of truncated cones placed base-to-base, with the end collet abutting the retainer; a potting compound is poured into the space between a received rod and the rings for locking the rod in place. Joslyn Manufacturing and Supply Company of Chicago, Ill. at one time made a fitting from a solid piece of steel having a bore extending from an open end to a closed end; cylindrical surfaces defined sections at opposite ends of the bore, and four intermediate sections were defined by alternately long, outwardly diverging surfaces and short, inwardly converging surfaces. The length of the respective intermediate sections were equal. Fiberflex Products, Inc. of Big Spring, Texas markets a similar product. The latter company is the assignee of U.S. Pat. No. 4,360,288 which discloses a sucker rod fitting or connector having an axial receptacle for a cylindrical fiberglass rod. The receptacle is a blind bore defined by a series of outwardly converging tapered surfaces into which an adhesive material is placed to form, when cured, a series of wedge shaped annuluses about the rod to secure it in the fitting. A collet is attached to the open end of the fitting to align the rod with the fitting.

One of the time-consuming and expensive problems in the field associated with sucker rod fittings is the replacement of sucker rods which have failed. In the case of fiberglass reinforced plastic rods used with the known fittings described above, breakage generally occurs outside of the fitting, and the break is characterized by a broomstraw effect where the plastic or resin and fiberglass strands separate. With such a break, it is a difficult and slow process to grasp the shattered part of the lower part of the sucker rod string and lift it to the surface, especially since it is not uncommon for such breaks to occur 1000 feet or more in the production tube beneath the surface of the earth. Once the part of the sucker rod string with the broken sucker rod is recovered, the rod is replaced by removing the failed rod and inserting the new rod in the couplings at its opposite ends.

SUMMARY OF THE INVENTION

An object of the invention is provided an improved sucker rod fitting which is effective and economical. Another object is to provide a sucker rod fitting wherein a sucker rod which has failed in a sucker rod string can be replaced in a fast and easy manner.

The inventor has found that the foregoing objects can be achieved by providing a sucker rod fitting configured to cause breaks which do occur in the sucker rod to occur in the fitting itself rather than on a section of the rod outside of the fitting. Such a fitting substantially eliminates the broomstraw effect, wherefore the severed part of the string can be lifted from the production tube so that the broken rod can be replaced.

According to a preferred embodiment of the invention, a fitting for a sucker rod includes an elongated member having a bore extending from an open end towards a closed end. The central portion of the bore is defined by alternately long radially outwardly tapered surfaces and short, radially inwardly tapered surfaces, the respective surfaces being dimensioned to cause failures of a retained sucker rod which do occur, to occur within the fitting.

DETAILED DESCRIPTION OF THE PREFERRED EMBODIMENT

Figures 1, 2:
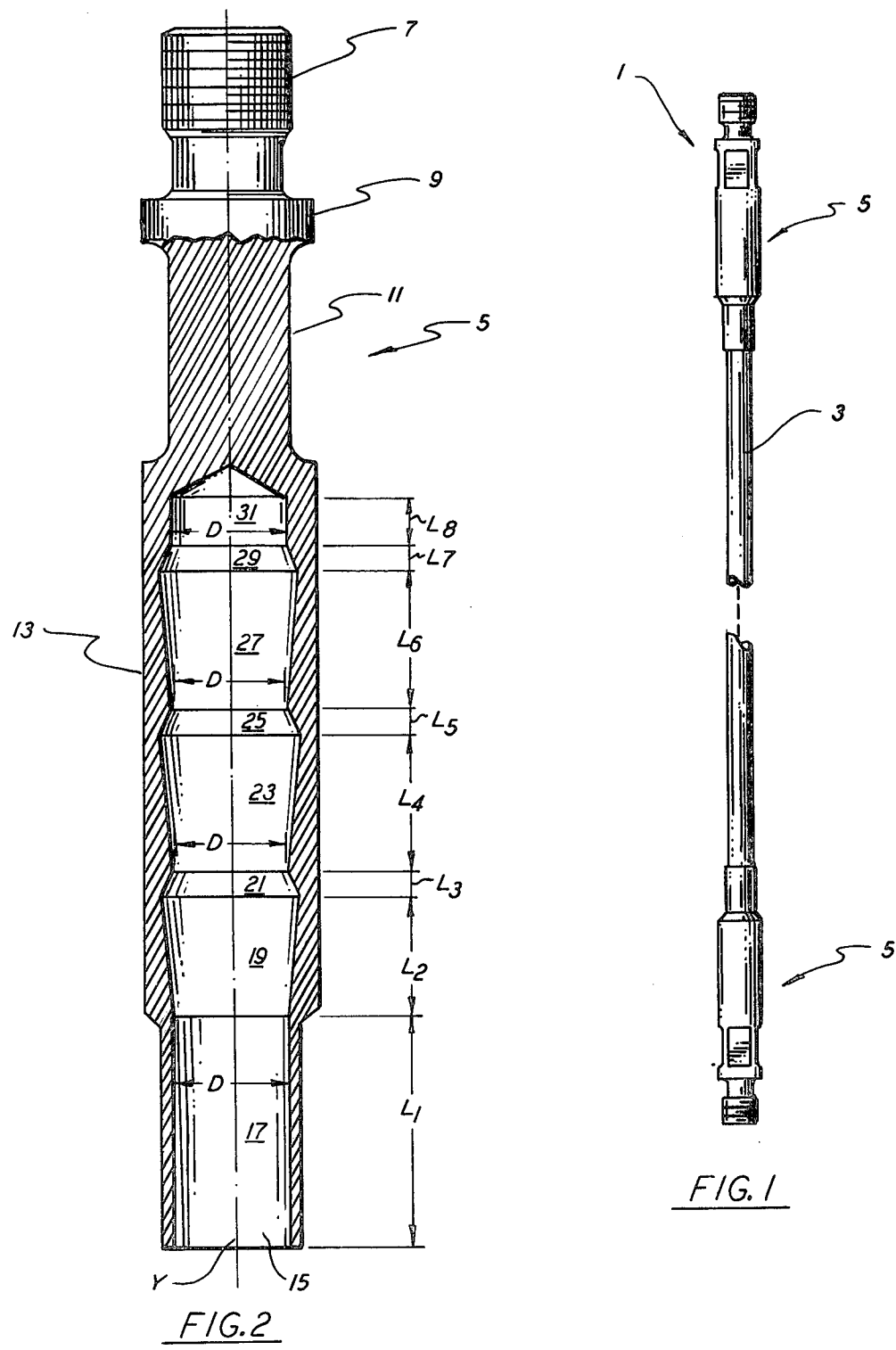
FIG. 1 shows a sucker rod retained at its opposite ends in a pair of sucker rod fittings according to the invention.
FIG. 2 shows a partially sectioned, side view of a sucker rod fitting according to the invention.

Referring first to FIG. 1, a sucker rod assembly 1 is shown comprising a fiberglass rod 3, or more specifically a resin plastic rod having reinforcing fiberglass fibers running lengthwise therein, whose respective ends are received by identical sucker rod fittings 5. As shown more clearly in FIG. 2, each fitting 5 includes a threaded connector end 7, a collar 9, a wrench flat 11, and a body portion 13 into which a bore 15 extends. Bore 15 is dimensioned to receive the end of rod 3 which is retained in the bore by an appropriate potting compound. Sucker rod assemblies 1 are used to transmit power from a pumping unit located above ground to a remote pump located in an oil well. Assemblies 1 are coupled together by internally threaded couplers or female couplings dimensioned and threaded to cooperate with connector ends 7. Since the wells are often thousands of feet deep, it is not unusual for from 25 to 200, 37½ foot long fiberglass sucker rods to be connected together in oil wells in which they are used.

It was explained earlier that a problem which has plagued prior art fiberglass sucker rod assemblies is the tendency of rods which fail in the field to break outside of the fitting, with the break being characterized by loose fibers or a broomstraw effect. It has been found by the present inventor that the broomstraw effect can be avoided by configuring and dimensioning bore 15 so that any breaks of rod 13 which do occur, will occur within the bore. When breaks of rods 3 occur in this manner in a production tube in the field, it is a routine and relatively simple task to lift the upper part of the string from the tube, and to lower a fish (a mechanical clamp) into the tube to grasp the severed end of the sucker rod string and pull it to the gound surface so that the string can be repaired.

Fitting 5 has been found to assure that breaks which occur in rod 3 are located within bore 15. Body 13 has an open end and a closed end. The body has an inner surface comprising various sections which define bore 15. A first cylindrical section 17 is disposed adjacent the open end, section 17 being symmetrical about an axis Y which is the central axis of bore 15. Section 17 has an inner diameter D and a length $L_1$, D being slightly larger than the outer diameter of sucker rod 3 so that rod 3 can slide into bore 15. A first long tapered section 19 is located next to section 17. Section 19 is defined by a wall tapering radially outwardly from the wall of section 17 towards the closed end of bore 15 to a first short tapered section 21 (the terms "outwardly" and "inwardly" are based on axis Y as a reference). Section 19 has a length $L_2$. Section 21 tapers inwardly from the end of section 19 towards the closed end and terminates at a second long tapered section 23. Section 21 has a length $L_3$ and the same inner diameter D at its narrowest part as section 17. Section 23 tapers outwardly from section 21 towards the closed end, and has a length $L_4$. Section 23 ends at a second short tapered section 25 which tapers inwardly from the end of section 23 to a narrow portion having the diameter D. Section 25 has a length $L_5$. A third long tapered section 27 begins at the narrowest part of the section 25, and tapers outwardly towards the closed end. The length of section 27 is $L_6$. A third short tapered section 29 tapers inwardly from the end of section 27 towards the closed end of bore 15, section 29 having the inner diameter D at its narrow end and a length $L_7$. A second cylindrical section 31 extends between section 29 and the closed end, and has the inner diameter D and a length $L_8$.

Length $L_2$ of long tapered section 19 is less than lengths $L_4$ or $L_6$ of long tapered sections 23 and 27. The lengths $L_3$, $L_5$ and $L_7$ are substantially equal. Length $L_8$ of second cylindrical section 31 is less than length $L_1$ of first cylindrical section 17. Fittings 5 for use with rods 3 having diameters of 1 inch have a diameter D of 1 inch, and the lengths $L_2$, $L_4$ and $L_6$ of the three long tapered sections are in the proportion $\frac{7}{8}:1\frac{1}{8}:1\frac{1}{8}$. Preferably, lengths $L_2$, $L_4$ and $L_6$ are, respectively $\frac{7}{8}$ inches, $1\frac{1}{8}$ inches and $1\frac{1}{8}$ inches where D is 1 inch. Furthermore, when the foregoing proportional relationship is met, lengths $L_1$ and $L_8$ of the two cylindrical sections are in the proportion 1 11/16:$\frac{5}{8}$ for fittings 5 for 1 inch diameter sucker rods, and when $L_2=\frac{7}{8}$ inches, $L_4=1\frac{1}{8}$ inches and $L_6=1\frac{1}{8}$ inches, $L_1=1$ 11/16 inches and $L_8=\frac{5}{8}$ inches.

When fittings 5 are to be used with rods 3 having outer diameters of $\frac{7}{8}$ inches, diameter D is $\frac{7}{8}$ inches, and lengths $L_2$, $L_4$ and $L_6$ are in the proportion $\frac{7}{8}:1:1$, and are preferably of the lengths $\frac{7}{8}$ inches, 1 inch and 1 inch. Furthermore, lengths $L_1$ and $L_8$ are in the proportion 1 11/16 and $\frac{5}{8}$; and when the lengths of $L_2$, $L_4$ and $L_6$ are $\frac{7}{8}$ inch, 1 inch and 1 inch, lengths $L_1$ and $L_8$ are 1 11/16 inches and $\frac{5}{8}$ inches respectively.

For each of the examples described above, the lengths $L_3$, $L_5$ and $L_7$ of the short tapered sections are preferably equal, and for the specific lengths mentioned the lengths of the short tapered sections are conveniently 3/16 inches. The long tapered sections are preferably tapered by the same amount; for the specific examples described, this taper is $4\frac{1}{2}°$. In order to assemble sucker rod assemblies fittings 5 are held vertically with the open end up and an appropriate potting compound is injected into the open end of bores 15 of fittings 5 so that the compound falls to the closed end of bore 15. The rod ends are inserted into the open ends of bores 15 of fittings 5 whose dimension D is slightly greater than the diameter of the rod, and the rod displaces the potting compound toward the open end of bore 5 and fills the void between the rod and the inner surfaces defining bore 15. Once the potting compound cures, it adheres to rod 3 and blocks against withdrawal of the rod from the fitting by virtue of the filling of the recesses of the tapered sections.

Fittings according to the invention which are configured and dimensioned as described above have been found to confine breakage of the sucker rods which does occur, to be located near the juncture of the first short tapered section 21 and the second long tapered section 23.

Fittings according to the invention are preferably made from an appropriate steel, such as A. I. S. I. 4620 cold rolled carbon steel having minimum 85,000 P. S. I. maximum 115,000 P. S. I. tensil strength, and Rockwell Hardness C17-C22. The fittings can be fabricated from standard rod stock using conventional machine tools.

The invention has been described in detail with emphasis on the preferred embodiment, but it should be understood that variations and modifications within the spirit and scope of the invention may occur to those skilled in the art to which the invention pertains.

I claim:

1. A sucker rod fitting for receiving an end of a sucker rod and for coupling the received sucker rod to another sucker rod, said sucker rod fitting comprising:
   an elongated body having an open end and a closed end, and an inner wall defining a generally cylindrical bore extending from said open end to said closed end;
   said inner wall comprising:
     a first cylindrical section adjacent said open end defining the axis of said bore and having a predetermined inner diameter slightly larger than the diameter of the sucker rod;
     a first long tapered section tapering outwardly from said first cylindrical section toward said closed end and having a predetermined length;
     a first short tapered section tapering inwardly from said first long tapered section toward said closed end to a position defining said predetermined diameter and having a predetermined length;
     a second long tapered section tapering outwardly from said first short tapered section toward said closed end and having a predetermined length;
     a second short tapered section tapering inwardly from said second long tapered section toward said closed end to a position defining said predetermined diameter and having a predetermined length;
     a third long tapered section tapering outwardly from said second short tapered section toward said closed end and having a predetermined length;

a third short tapered section tapering inwardly from said third long tapered section toward said closed end to a position defining said predetermined diameter and having a predetermined length; and a second cylindrical section extending from said third short tapered section toward said closed end and having said predetermined diameter;

wherein said sections are dimensioned to cause a sucker rod received in said bore and engaged by said wall sections having said predetermined diameter to break within said bore when breaking stress is applied to the sucker rod.

2. The invention according to claim 1 wherein the predetermined length of said first long tapered section is less than the predetermined lengths of either of said second or third long tapered sections.

3. The invention according to claim 2 wherein the predetermined length of said second and third long tapered sections are substantially equal.

4. The invention according to claim 2 wherein the predetermined lengths of said second cylindrical section is less than the predetermined length of said first cylindrical section.

5. The invention according to claim 2 wherein the predetermined diameter is one inch, and the predetermined lengths of said first, second and third long tapered sections are in the proportion $\frac{7}{8}:1\frac{1}{8}:1\frac{1}{8}$.

6. The invention according to claim 2 wherein the predetermined diameter is one inch, and the predetermined lengths of said first cylindrical section; said first, second and third long tapered sections; and said second cylindrical section are in the proportion 1 11/16:$\frac{7}{8}$:1$\frac{1}{8}$:1$\frac{1}{8}$:$\frac{5}{8}$.

7. The invention according to claim 2 wherein the predetermined lengths of said first, second and third short tapered sections are substantially equal.

8. The invention according to claim 2 wherein said first, second and third long tapered sections are tapered by substantially the same amount.

9. The invention according to claim 2 wherein the predetermined diameter is $\frac{7}{8}$ inches, and the predetermined lengths of said first, second and third long tapered sections are in the proportion $\frac{7}{8}$:1:1.

10. The invention according to claim 2 wherein the predetermined diameter is $\frac{7}{8}$ inches, and the predetermined lengths of said first cylindrical section; said first, second and third long tapered sections; and said second cylindrical section, are in the proportion 1 11/16:$\frac{7}{8}$:1:1:$\frac{3}{8}$.

11. A sucker rod fitting for receiving an end of a fiberglass sucker rod and for coupling the received sucker rod to another sucker rod, said sucker rod fitting comprising an elongated member having internal surfaces defining a bore extending from an open end of said member to a closed end, said internal surfaces including alternately long, radially outwardly tapered surfaces extending toward said closed end, and short radially inwardly tapered surfaces extending toward said closed end, said surfaces being dimensioned to cause breaks which occur in a received sucker rod to occur within said bore.

* * * * *